Oct. 19, 1965     R. S. ROTHSCHILD     3,213,388
MULTI-PHASE OSCILLATOR UTILIZING SINGLE-PHASE TECHNIQUES
Filed July 27, 1961

INVENTOR.
RAYMOND. S. ROTHSCHILD
BY
*James and Franklin*
ATTORNEYS

United States Patent Office 3,213,388
Patented Oct. 19, 1965

1

3,213,388
MULTI-PHASE OSCILLATOR UTILIZING SINGLE-PHASE TECHNIQUES
Raymond S. Rothschild, 62—59 108th St., Forest Hills, N.Y.
Filed July 27, 1961, Ser. No. 127,290
2 Claims. (Cl. 331—45)

The present invention relates to a novel method and circuitry for utilizing single phase oscillator techniques to produce a multi-phase oscillator.

There is an appreciable demand for multi-phase power supplies, particularly those in which the frequency of oscillation can be varied or adjusted over a range. Such devices are used as sources of power for utilitarian equipment and also as power sources for test purposes. The accuracy of the magnitude and phase relationships of the several output voltages is of particular importance in connection with laboratory equipment, but is also of significance when working machines are to be powered.

The use of rotating electrical machinery for the production of multi-phase voltages is common, but is subject to many disadvantages. Mechanically moving parts are undesirable, and usually the phase relationships cannot be altered. As a result attempts have been made to produce such a power supply electronically, without any moving mechanical parts. Electronic oscillator circuits have been employed to that end, but the matching of the various circuit elements and particularly the variable circuit elements to one another, in order to maintain the proper magnitudes and phase relationships of the different phase outputs to one another, has given rise to considerable design difficulty and resulted in extremely complex circuitry, with consequent high cost and low reliability of equipment. Three-phase power supplies are those most often required, and in electronic three-phase power supplies of the type previously used the frequency of the three phases was controlled by three different sections of a ganged condenser. Each of these sections had to be carefully matched to the others for all operating positions thereof, and this gave rise to an understandably difficult task of matching and calibration. It is not overly difficult to match two condenser sections to one another, but when a third section must be matched to both of the first two the back and forth compensations and adjustments which must be made are extremely time consuming and often utterly frustrating, particularly when each of the sections is used with different circuitry where stray capacitances enter into the picture to a significant extent.

In accordance with the present invention, accurate production of a three-phase voltage is accomplished by means of simplified circuitry involving the use of but a pair of variable reactances which need be matched to one another. The basic circuitry involved is adaptable to the production of one, two or three-phase voltages, as desired, and over an appreciable range of desired frequencies. Through suitable modification the circuitry can be used as a phase shifter variable from zero to 360 degrees. Its power output is such that it can be used as a power supply for useful machinery, and its accuracy is such, both as to amplitude and phase relationship that it can be used for accurate laboratory work. All of this is accomplished by means of apparatus which is considerably less expensive and more reliable than that which has previously been employed for this purpose.

An oscillator of the Wien bridge type is employed, with the adjustable reactances (usually condensers) in the amplifier output-to-input and amplifier input-to-ground circuits respectively being ganged for simultaneous variation to control the frequency of the output voltages. The amplifier input-to-ground impedance is so designed as to have

2 a point thereon which is always at a predetermined phase relationship to the output of the basic oscillator circuit. One way in which this can be done is to place a resistor in series with the variable capacitor in the amplifier input-to-ground circuit, the point between that resistor and that capacitor having the characteristic in question, and that phase relationship remaining uniform despite variations in the frequency of the output voltages. Through appropriate circuit design, a wide variety of different phase differences can be produced. What is more, the magnitude of the voltage at that take-off point between resistor and capacitor can be made to maintain a fixed relation to the magnitude of the output voltage from the basic oscillator as the oscillator frequency is varied, thus making it relatively simple to maintain the desired magnitude relation between the various voltages as well as the desired phase relation therebetween.

It has been found to be particularly advantageous, especially when a three-phase power supply is to be produced, to so design the amplifier input-to-ground circuit that the voltage at the take-off point between said resistor and said capacitor has a sixty-degree leading phase relationship to the output of the basic oscillator. Hence if the voltage at said point has its phase inverted and is appropriately proportionately amplified, the resultant voltage will have the same magnitude as the primary output voltage of the basic oscillator but will lead that basic voltage by 240 degrees. It is thus appropriate to constitute a second phase of a three-phase system. If the primary output voltage and the thus-produced resultant output voltage are now added to one another by a conventional summing resistor circuit, and the output therefrom has its phase inverted and is appropriately amplified, a third voltage will be produced which will have the same amplitude as the primary output voltage and which will lead that voltage by 120 degrees. These three voltages constitute an appropriately designed three-phase voltage supply. In this manner three phases are produced by means of only a pair of adjustable reactances.

To the accomplishment of the above, and to such other objects as may hereinafter appear, the present invention relates to a multi-phase oscillator system as defined in the appended claims and as described in this specification, taken together with the accompanying drawings, in which:

Figure 1:
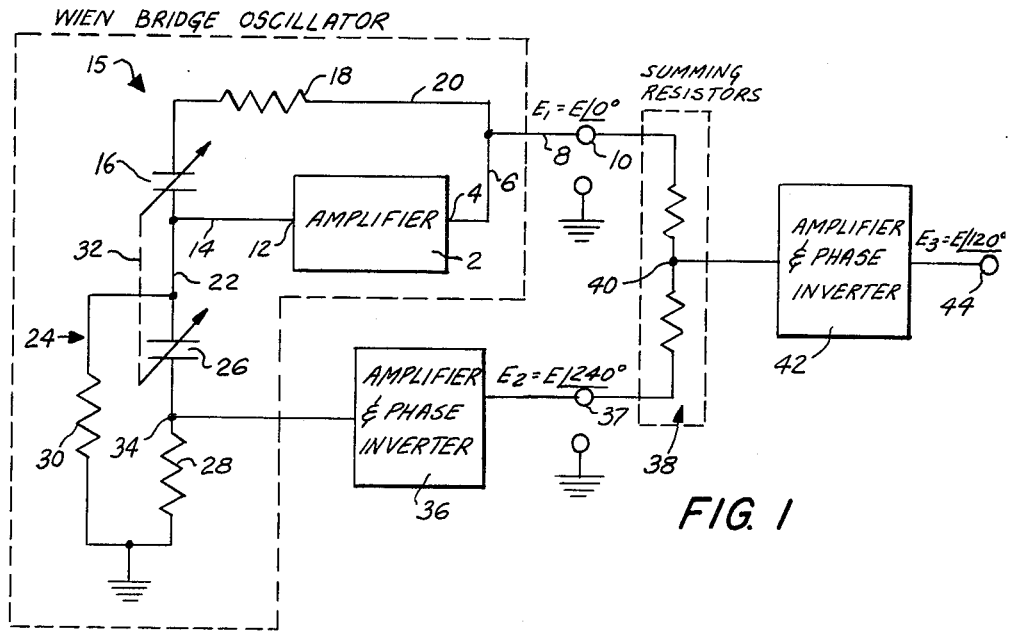
FIG. 1 is a circuit diagram of one embodiment of the present invention, showing its use in the production of a conventional three-phase power supply.

In accordance with the present invention the first or primary alternating voltage $E_1$ is produced by an oscillator of the Wien bridge type. It comprises an amplifier 2 having an output terminal 4 connected by leads 6 and 8 to point 10. The input terminal 12 of the amplifier 2 is connected by lead 14, impedance 15, and leads 20 and 6 to the output terminal 4 of the amplifier 2. The impedance 15 comprises variable reactance element 16 (here drawn as an adjustable capacitor) and resistor 18. The amplifier input terminal 12 is also connected to ground by leads 14 and 22 and an impedance generally designated 24 and comprising a second adjustable reactance element 26 (here shown as a variable capacitor) and a resistance 28 connected in series, another resistor 30 being connected in parallel with the reactance element 26 and the resistor 28. The impedance 15 is connected between the amplifier output terminal 4 and amplifier input terminal 12, while the impedance 24 is connected between the amplifier input terminal 12 and ground. In order for the circuit to oscillate and thus produce an alternating voltage at the point 10 the voltage applied to the amplifier input terminal 12 and derived from the amplifier output terminal 4 must be in phase with the voltage at the output terminal 4. In order for this relationship to occur throughout the range of frequencies over which the system is designed to function, which frequencies are selected through simultaneous variations of the capacitors 16 and 26 (as indicated by the broken line 32) the phase angles of the impedances 15 and 24 must be equal to one another over that range of frequencies. This is all well known in the design of Wein bridge oscillators.

In order to derive from this oscillator a voltage which is at a predetermined phase relationship to the voltage $E_1$ at point 10, an impedance element, here constituted by the resistor 28, is placed in series with the variable reactance element 26 in the input-to-ground impedance 24. When this is done the voltage at the point 34 between the impedance element 28 and the variable capacitor 26 will have that predetermined phase relationship. When, as is here specifically disclosed, the impedance element 28 is constituted by a resistor of appropriate magnitude, that phase relationship will remain constant as the frequency of the output voltage $E_1$ at point 10 is varied and, in addition, the relationship of the magnitude of the voltage at point 34 to the magnitude of the voltage at point 10 will also remain constant.

Hence the voltage at point 34, appropriately modified as to phase and/or amplitude if required, together with the voltage at point 10 define a two-phase voltage supply of desired characteristics. Ordinarily in a two-phase voltage supply the two voltages are 90° out of phase with one another, and this can readily be accomplished by assigning proper values to the several elements which make up impedance 24. In special cases where a different phase relationship may be desired, the several elements of impedance 24 can be designed appropriately.

The value assigned to impedance element 28 and the value assigned to the reactance element 26 will determine the phase relation between the voltage at point 12 and the voltage along the impedance element 28. The phase of the voltage along the impedance element 28, when it is a resistor, will be uniform, but the magnitude of that voltage relative to ground will vary along its length. Thus if we selectively connect to different points along the resistor 28 we will tap off a voltage having the desired phase relationship to the voltage at point 12 but having a magnitude dependent upon the particular tap point selected. In this way control of the magnitude of the second voltage can be achieved.

If the circuit of impedance 24 is so designed that the voltage at point 34 has a sixty-degree leading relationship with respect to the voltage at point 10, the production of a three-phase voltage supply is greatly facilitated. When that is done the magnitude of the voltage at point 34 is approximately one-half that of the voltage at the amplifier input terminal 12.

Figure 3:
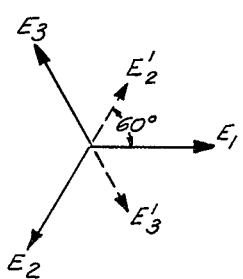
FIG. 3 is a diagrammatic representation of various of the voltages produced.

Having reference to FIG. 3, the vector $E_1$ represents the voltage $E_1$ at point 10 and the dotted line vector $E_2'$ represents the voltage at point 34. If that voltage is now amplified and has its phase inverted, as by the conventional circuitry designated 36, a voltage $E_2$ will be produced at point 37, the vector indication of which is shown in FIG. 3, that voltage leading $E_1$ by 240 degrees and having a magnitude equal to that of $E_1$. If portions of the voltages $E_1$ and $E_2$ are now added by the conventional summing resistors generally designated 38, a voltage $E_3'$ will be produced at point 40 which, as shown in FIG. 3, will lag voltage $E_1$ by sixty degrees and will have an amplitude one-half that of $E_1$. If this voltage $E_3'$ is now appropriately amplified and phase inverted, as by the conventional circuitry designated 42, a voltage $E_3$ will be produced at point 44 which will lead $E_1$ by 120 degrees and will have the same voltage as $E_1$.

It will be appreciated that the voltages $E_1$, $E_2$ and $E_3$ at the points 10, 37 and 44 respectively constitute a proper three-phase voltage supply with the various voltages in proper phase and amplitude relationship.

As the capacitors 16 and 26 are varied the frequency of oscillation will correspondingly vary, and thus the frequencies of the three voltages $E_1$, $E_2$ and $E_3$ will vary, but their phase relationships and relative magnitudes will remain the same.

In designing the input-to-ground impedance 24 the values of the resistors 28 and 30 are so chosen as to make the overall magnitude and phase characteristics of the impedance 24 the same as that in a conventional Wien bridge oscillator (in which the resistor 28 is absent). The magnitude of the resistor 28 is so chosen as to produce the desired phase relationship between the voltages at points 12 and 34. When the impedance element 28 is in the form of a resistor, as shown, the phase relationship between the voltages at points 34 and 12 will remain the same despite variations in the output frequencies. If the impedance element 28 were to comprise a reactance, then that reactance would have to be varied in a manner appropriately synchronized with the variations in the reactance elements 16 and 26 if a constant phase relationship were desired.

Figure 2:
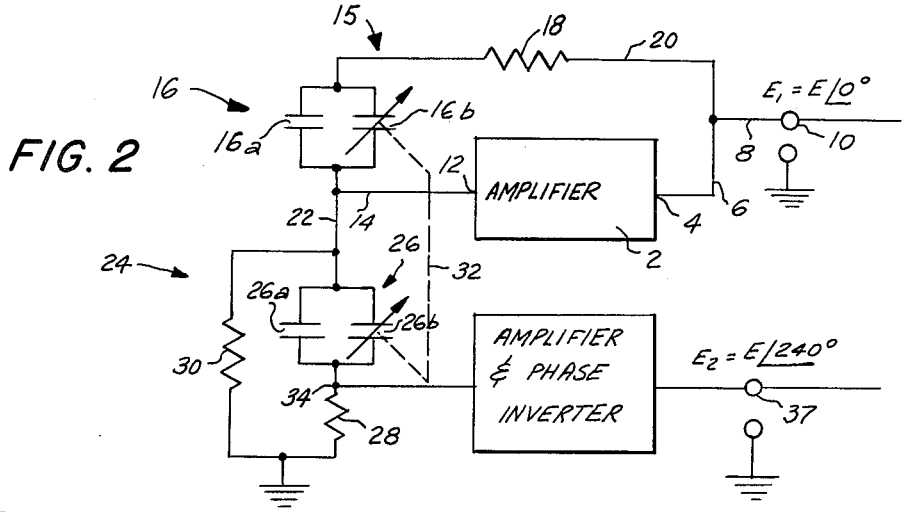
FIG. 2 is a view similar to that portion of FIG. 1 illustrating the production of the first two voltages, but showing a somewhat modified circuit design.

In actual practice, and as shown in FIG. 2, it has been found desirable, largely because of the availability of certain standard variable capacitors, to constitute the reactance element 16 by a fixed capacitor 16a and a variable capacitor 16b connected in parallel, and to similarly constitute the reactance element 26 by a fixed capacitor 26a and a variable capacitor 26b connected in parallel. With the circuit of FIG. 2, in order to produce a three phase power supply the frequency of oscillation of which is variable between approximately 300 c.p.s. and 550 c.p.s., the following circuit values are employed:

Resistor 18 _____ 164K ohms.
Capacitor 16a _____ 360 mmf.
Capacitor 16b _____ 5–342.2 mmf.
Resistor 30 _____ 2.4 megohms.
Capacitor 26a _____ 360 mmf.
Capacitor 26b _____ 5–342.2 mmf.
Resistor 28 _____ 441K ohms.

With the circuitry of the present invention it is necessary to match only the two capacitor sections 16 and 26 even though three phases are produced, thus greatly simplifying the alignment and calibration problems existing in prior art arrangements. Moreover, fewer circuit components are employed than in prior art arrangements, so that the overall apparatus is considerably less expensive and considerably more reliable. In addition, the phase relationship is determined by non-variable circuit elements (primarily the resistor 28), so that said phase relationship is accurately maintained. By producing a device in which the value of resistor 28 is varied, along with cooperating variation of the resistor 30, the apparatus can be modified so as to produce any desired phase difference between the voltages at points 12 and 34 without detracting from the frequency control afforded by the capacitors 16 and 26.

While but a single embodiment of the present invention has been here specifically disclosed, it will be apparent that many variations may be made therein, all within the scope of the instant invention as defined in the following claims.

I claim:

1. A multi-phase oscillator comprising an amplifier having output and input terminals, said output terminal being connected to said input terminal by a first impedance comprising a first resistor and a first capacitor connected in series, said input terminal being connected to ground by a second impedance, operatively remote from said output comprising a second resistor connected in parallel with a network comprising a second capacitor and a third resistor connected in series, the phase angles of said impedances being the same and such as to cause the phase of the signal fed to said input terminal from said output terminal to be in oscillation-producing phase with said amplifier output voltage, and an electrical out-of-phase output connection to a point on said third resistor spaced from the ground-connected end thereof.

2. The oscillator of claim 1, in which said first and second capacitors have the same value and the value of said third resistor is such as to cause the voltage at said point to have a predetermined phase relationship to the signal at said input terminal.

References Cited by the Examiner

UNITED STATES PATENTS

| | | | |
|---|---|---|---|
| 2,236,985 | 4/41 | Bartelink | 331—137 |
| 2,601,416 | 6/52 | Idzerda | 331—141 |
| 2,666,851 | 1/54 | Carniol | 331—45 |
| 2,778,940 | 1/57 | Sulzer | 331—45 |
| 2,791,694 | 5/57 | Groenendyke | 331—45 |
| 2,820,903 | 1/58 | Roulston et al. | 331—45 |

ROY LAKE, *Primary Examiner.*

JOHN KOMINSKI, *Examiner.*